(12) United States Patent
Gardner

(10) Patent No.: US 7,995,588 B2
(45) Date of Patent: Aug. 9, 2011

(54) SYSTEMS AND METHODS FOR DISTRIBUTING DATA WITHIN AN INTERNET HAVING A PLURALITY OF NODES

(75) Inventor: Paul Anton Gardner, Burnham (GB)

(73) Assignee: Vuze LLC, San Mateo, CA (US)

( * ) Notice: Subject to any disclaimer, the term of this patent is extended or adjusted under 35 U.S.C. 154(b) by 1115 days.

(21) Appl. No.: 11/384,388

(22) Filed: Mar. 21, 2006

(65) Prior Publication Data

US 2007/0177587 A1    Aug. 2, 2007

Related U.S. Application Data

(60) Provisional application No. 60/762,528, filed on Jan. 27, 2006.

(51) Int. Cl.
*H04L 12/28* (2006.01)
(52) U.S. Cl. ......... 370/397; 370/389; 370/399; 370/428
(58) Field of Classification Search ................... 370/389, 370/428, 397, 392
See application file for complete search history.

(56) References Cited

U.S. PATENT DOCUMENTS

| | | | |
|---|---|---|---|
| 7,263,528 B2 * | 8/2007 | Haff et al. | 707/102 |
| 2002/0032766 A1* | 3/2002 | Xu | 709/223 |
| 2002/0067730 A1* | 6/2002 | Hinderks et al. | 370/395.52 |
| 2003/0088778 A1* | 5/2003 | Lindqvist et al. | 713/182 |
| 2003/0097597 A1* | 5/2003 | Lewis | 713/202 |
| 2003/0195974 A1* | 10/2003 | Ronning et al. | 709/230 |
| 2009/0024749 A1* | 1/2009 | Harrang et al. | 709/228 |

* cited by examiner

*Primary Examiner* — Dang T Ton
*Assistant Examiner* — Pamit Kaur
(74) *Attorney, Agent, or Firm* — Jackson Patent Law Office

(57) ABSTRACT

Disclosed are systems and methods for distributing data. In an exemplary method of distributing data within an internet, there is a step of receiving, in a first node, an identifier corresponding to a file. Subsequently, the exemplary method uses the identifier to select a second node, by performing an operation with the identifier and an ID for a node in the internet. The exemplary method receives, in the first node, an address set from the second node. This address set could, for example, include addresses corresponding to a swarm in the Bittorrent protocol.

21 Claims, 6 Drawing Sheets

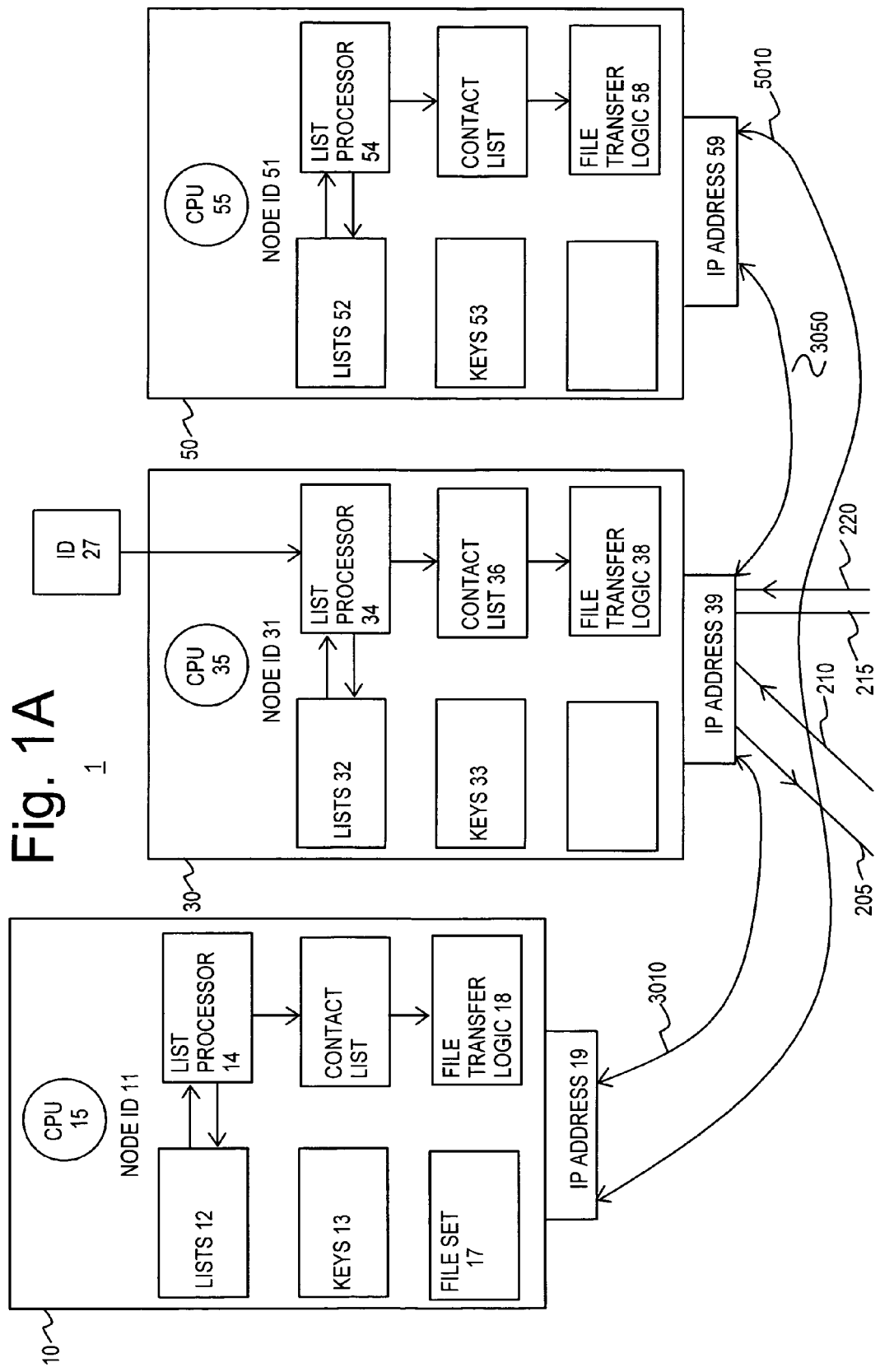

ID 27-------IP ADDRESS 375, port 1681
ID 27-------IP ADDRESS 305, port 1681
ID 27-------IP ADDRESS 59, port 1683
ID 27-------IP ADDRESS 315, port 1681
ID 27-------IP ADDRESS 19, port 1682
ID 27-------IP ADDRESS 375, port 1681
ID 27-------IP ADDRESS 375, port 1686
another key-------another dataset
yet another key-------yet another dataset

IP ADDRESS 59, port 1683
IP ADDRESS 19, port 1682

SYSTEMS AND METHODS FOR DISTRIBUTING DATA WITHIN AN INTERNET HAVING A PLURALITY OF NODES

This Application claims the benefit of Application Ser. No. 60/762,528 of PAUL ANTON GARDNER filed Jan. 27, 2006 for SYSTEMS AND METHODS FOR DISTRIBUTING DATA, the contents of which are herein incorporated by reference.

BACKGROUND OF THE INVENTION

1. Field of the Invention

This invention relates generally to systems and methods for distributing data and, more particularly, to systems and methods of distributing data to a plurality of recipients.

2. Description of Related Art

Data distribution on the Internet typically relies on a central server as the source. The bandwidth demands on the server thus increase as the number of recipients increases.

SUMMARY OF THE INVENTION

To address the problem above, there is a method in a network having a plurality of nodes. The method comprises receiving, in a first node, a first identifier, the first identifier corresponding to a file, the file having a plurality of portions; using the first identifier to select a second node, by performing an operation with the first identifier and an ID for a node in the system; receiving an address set from the second node; in the first node, using an address from the set, to receive a first portion of the file; and in the first node, using the address from the set to send the first portion of the file.

According to another aspect of the present invention, a system comprises circuitry that receives, in a first node, a first identifier, the first identifier corresponding to a file, the file having a plurality of portions; circuitry that uses the first identifier to select a second node, by generating a first result by performing an operation with the first identifier and a second identifier, the second identifier corresponding to a node, generating a second result by performing the operation with the first identifier and a third identifier, the third identifier corresponding to another node, and selecting the second node by comparing the first and second results; circuitry that receives a first IP address and a second IP address from the second node; circuitry, in the first node, that uses the first IP address to receive a first portion of the file; circuitry, in the first node, that uses the second IP address to send the first portion of the file; and circuitry, in the first node, that uses the second IP address to receive a second portion of the file.

According to yet another aspect of the present invention, there is a method in a network having a plurality of nodes. The method comprises receiving, in a first node, a first identifier, the first identifier corresponding to a data structure, the data structure having a plurality of portions; using the first identifier to select a second node, by generating a first result by performing an operation with the first identifier and a second identifier, the second identifier corresponding to a node, generating a second result by performing an operation with the first identifier and a third identifier, the third identifier corresponding to another node, and selecting the second node by comparing the first and second results; receiving a first IP address and a second IP address from the second node; in the first node, using the first IP address to receive a first portion of the data structure; in the first node, using the second IP address to send the first portion of the data structure; and in the first node, using the second IP address to receive a second portion of the data structure.

According to yet another aspect of the present invention, there is a method in a network having a plurality of nodes, the method comprises receiving, in a first node, a first signal, the first signal corresponding to a file, the file having a plurality of portions; using the first signal to select a second node, by generating a first result by performing an operation with the first signal and a second signal, the second signal corresponding to a node, generating a second result by performing an operation with the first signal and a third signal, the third signal corresponding to another node, and selecting the second node by comparing the first and second results; receiving a first IP address and a second IP address from the second node; in the first node, using the first IP address to receive a first portion of the file; in the first node, using the second IP address to send the first portion of the file; and in the first node, using the second IP address to receive a second portion of the file.

BRIEF DESCRIPTION OF THE DRAWINGS

References are made to the following text taken in connection with the accompanying drawings, in which:

FIGS. 1A and 1B are a diagram of a system for distributing data in accordance with a preferred embodiment of the invention.

FIG. 3 shows data stored by a computer node in the exemplary system.

FIG. 4 shows a subset of data selected from the data of FIG. 3 and sent to another node in the exemplary system.

The accompanying drawings which are incorporated in and which constitute a part of this specification, illustrate embodiments of the invention and, together with the description, explain the principles of the invention, and additional advantages thereof. Certain drawings are not necessarily to scale, and certain features may be shown larger than relative actual size to facilitate a more clear description of those features. Throughout the drawings, corresponding elements are labeled with corresponding reference numbers.

DETAILED DESCRIPTION OF EXEMPLARY EMBODIMENTS

Figure 1B:
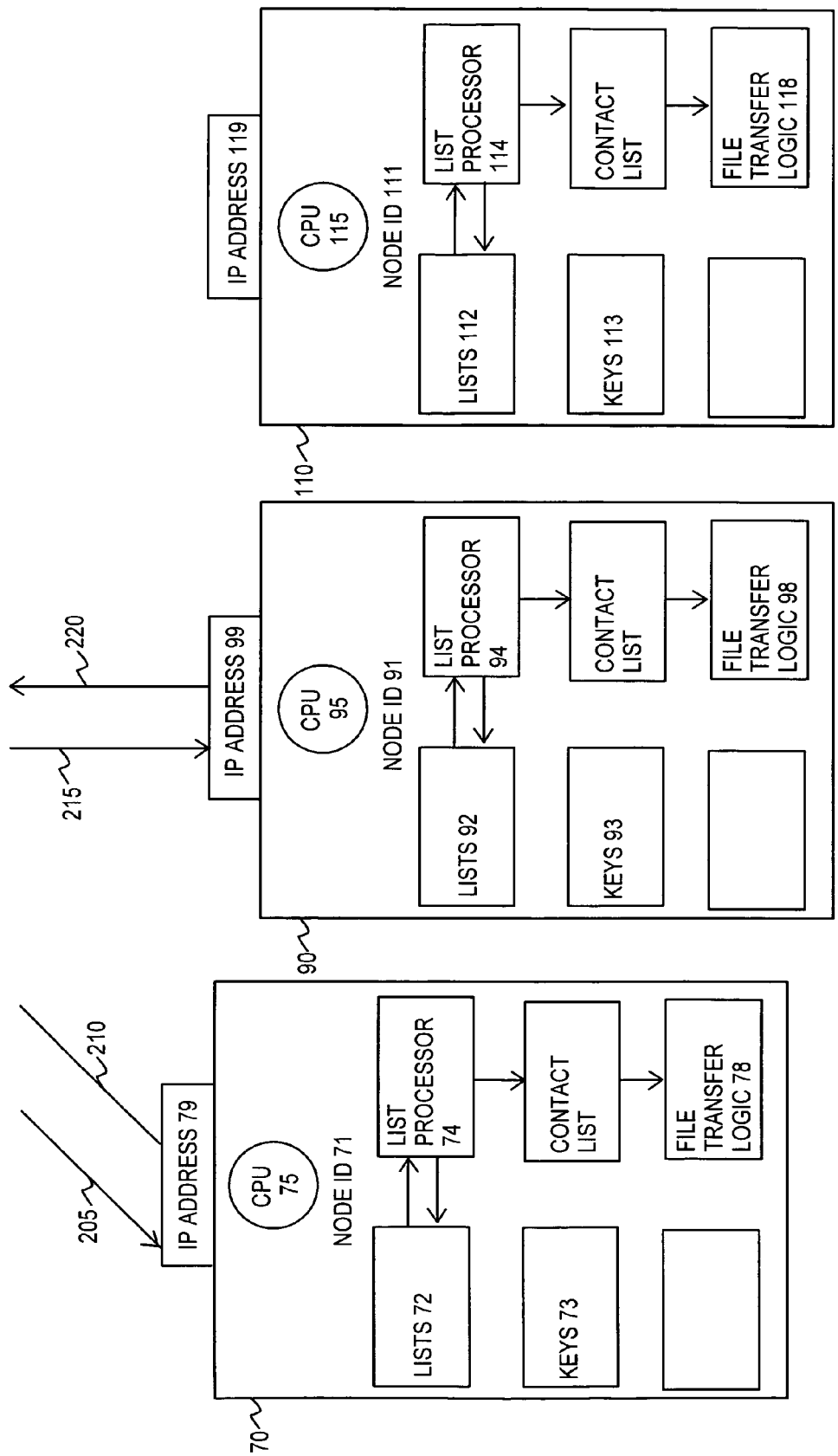

FIGS. 1A and 1B show system 1 in accordance with an exemplary embodiment of the present invention. Computer node 10 is operated by the Acme record company. Node 10 stores digital file set 17. File set 17 includes one or more files, including an audio recording of "First Album" by the group "Undiscovered." System 1 acts to distribute file set 17 to computer node 30 in the home of Smith, and computer node 50 in the home of Jones. Computer nodes 70 and 90 in the homes or businesses of other people have a role in the process of distribution of file set 17, as described in more detail below. At no time, however, do nodes 70 or 90 store part of file set 17, although nodes 70 and 90 have circuitry for doing so.

In this Patent Application, the word circuitry encompasses dedicated hardware, and/or programmable hardware, such as a CPU or reconfigurable logic array, in combination with programming data, such as sequentially fetched CPU instructions or programming data for a reconfigurable array.

Each of computer nodes 10, 30, 50, 70, 90, and 110 has an IP address identifying the node on the Internet. The IP address may be directly associated with the node or may be the IP address of a network translation unit (NAT) to which the node is connected. System 1 may have thousands or millions of nodes containing the same circuitry as node 10 described below, and operating concurrently. System 1 has much less than $2^{160}$ nodes, however.

Node 10 has IP address 19, node 30 has IP address 39, node 50 has IP address 59, node 70 has IP address 79, node 90 has IP address 99 and node 110 has IP address 119.

Each of computer nodes 10, 30, 50, 70, 90, and 110 includes a memory storing data such as a node ID and various lists, and storing instructions executed by a central processing unit (CPU) to effect list processing logic and file transfer logic. Each node has a unique 160 bit node identifier (ID). Node 10 has ID 11, node 30 has ID 31, node 50 has ID 51, node 70 has ID 71, node 90 has ID 91 and node 110 has ID 111.

Each of nodes 10, 30, 50, 70, 90, and 110 includes a memory storing lists of nodes. These lists may be conceptualized as a list for each $0 \leq i < 160$, each list containing a set of IP address; UDP port; Node ID triples for nodes having an ID for which the distance is between $2^i$ and $2^{i+1}$ from its own ID. The distance is defined as the bitwise exclusive OR (XOR) of the two 160 bit numbers.

Figure 2:
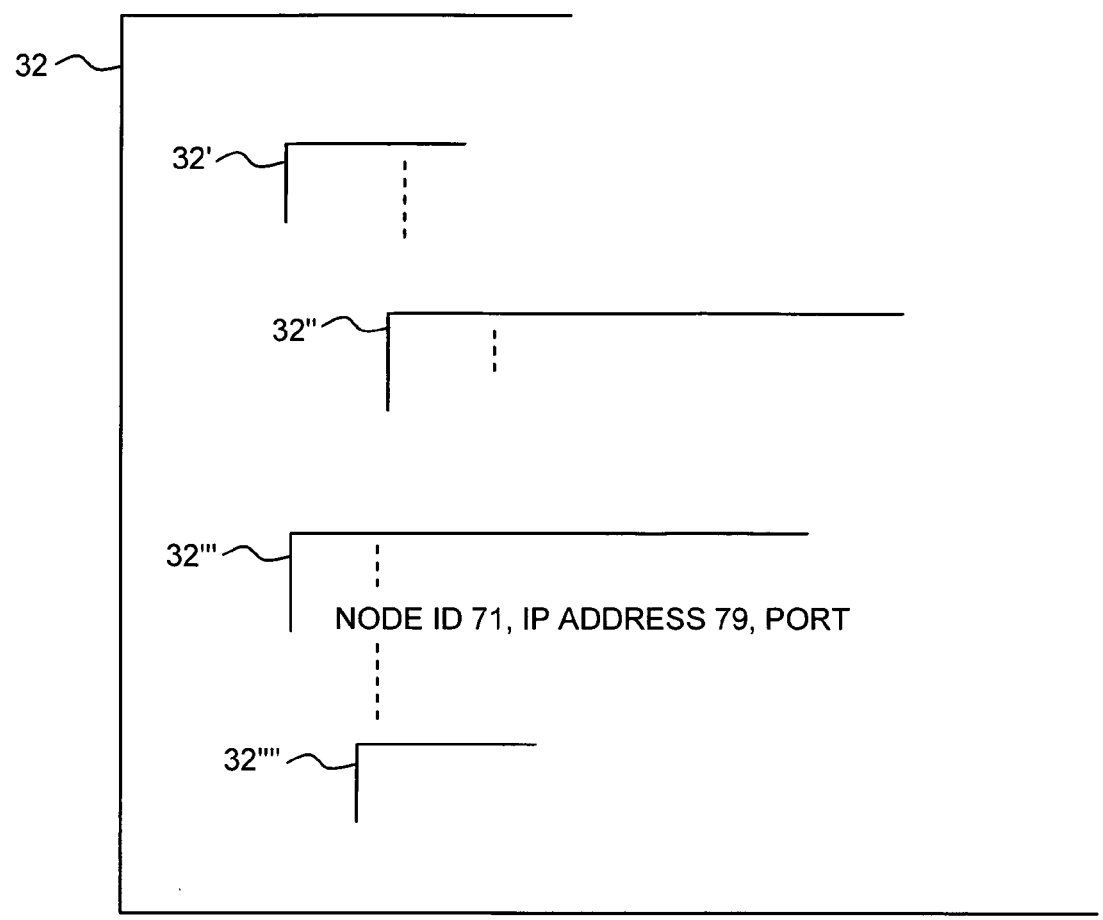
FIG. 2 is a diagram emphasizing a part of the structure shown in FIG. 1.
Figure 2:
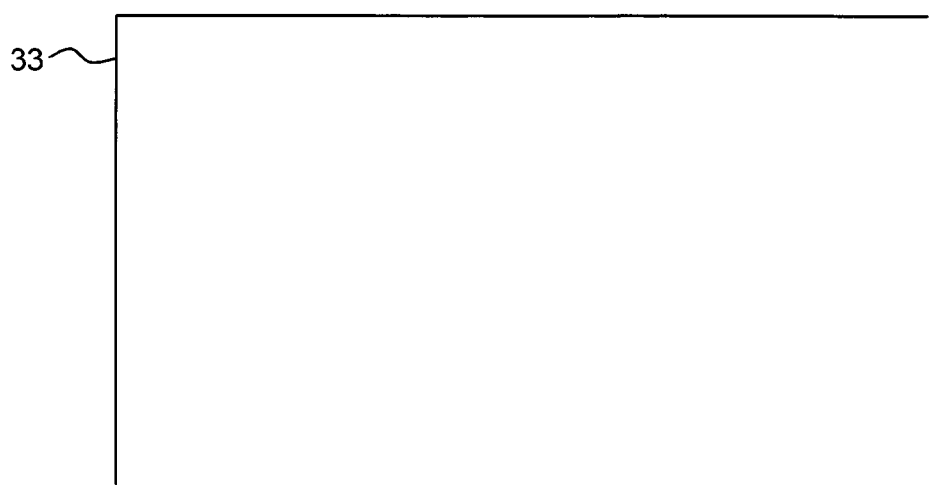

For example, FIG. 2 shows lists 32 in node 30. Lists 32 includes list 32', 32'', 32''', and 32''''. List 32' stores triples nodes for which the node ID has a distance between $2^{159}$ and $2^{160}$ from ID 31. List 32'' stores nodes for which the node ID has a distance between $2^{158}$ and $2^{159}$ from ID 31. List 32''' stores nodes for which the node ID has a distance between $2^{157}$ and $2^{158}$ from ID 31. List 32'''' stores nodes for which the node ID has a distance between $2^{156}$ and $2^{157}$ from ID 31. List 32''''' stores nodes for which the node ID has a distance between $2^{155}$ and $2^{156}$ from ID 31, etc. Lists 32 also includes other lists, many of which may be empty for small values of i. For large values of i, each list may be of size k, where k is a system-wide replication parameter. In system 1, k=20, for example.

List 32''' includes the node ID 71 of node 70.

The structure of lists 12 in node 10 is the same as the structure of lists 32, although the content of lists 12 may be different from the content of lists 32. The structure of lists 52 in node 50 is the same as the structure of lists 32, although the content of lists 52 may be different from the content of lists 32. The structure of lists 72 in node 70 is the same as the structure of lists 32, although the content of lists 72 may be different from the content of lists 32. The structure of lists 92 in node 90 is the same as the structure of lists 32, although the content of lists 92 may be different from the content of lists 32. The structure of lists 112 in node 110 is the same as the structure of lists 32, although the content of lists 12 may be different from the content of lists 32.

Computer node 30 receives an identifier 27 for file set 17, and uses identifier 27 to select a node from a lists 32 of nodes stored in node 30. More specifically, list processor 34 includes instructions executed by CPU 35. List processor 34 takes a file set identifier, such as identifier 27, as input, and generates for output a list 36 of IP addresses of nodes having some or all of file set 17. List processor 34 generates this list 36 by locating the node having an ID that is the closest to identifier 27. To locate this closet node, processor 34 reads from lists 32 to extract the available node in lists 32 having an ID the closest to identifier 27. Processor then send a UDP message to the extracted node. The UDP message contains identifier 27 and a request to return 1) the IP address of a node having a closer ID; or 2) if no node has a closer ID, data stored in association with the ID.

In the example of system 1, processor 34 determines that node ID 71, in lists 32, is the closest to file set ID 27. Processor 34 then sends UDP message 205, including ID 27, to node 70. Processor 74 determines that node ID 91, in lists 72, is the closest to file ID 27, and thus processor 74 sends UDP message 210, including IP address 99, in reply to node 30.

Processor 34 then sends UDP message 215, including ID 27, to node 90. In this example, node ID 91 is closer to ID 27 than any node ID in lists 92.

Node 90 includes data structure 93 storing keys, each key having 160 bits. Each key is stored in association with one or more sets of values. To process a message such as message 215, each set of values includes an IP address and port number for the node that wrote the value.

Data structure 93 is storing ID 27 and storing IP addresses association with ID 27. Processor 94 sends UDP message 220, including list 36, in reply to node 30.

Processor 94 includes logic to select a subset of the data stored in association with a particular key, and send only the subset in the reply to node 30. Processor 94 selects the subset in a pseudo random fashion. FIG. 3 shows a content of data structure 93. The entry on line 3 exists because node 50 sent a UDP message to node 90, the message containing a request to store IP address 59 and port 1683 in association with ID 27 as the key. The entry on line 5 exists because node 10 sent a UDP message to node 90, the message containing a request to store IP address 19 and port 1682 in association with ID 27 as the key, as the key. Etc.

FIG. 4 shows a subset of data generated by processor 94, from the data of FIG. 3, and sent to node 30.

The structure of data structure 13 in node 10 is the same as the structure of data structure 93, although the content of data structure 13 may be different from the content of data structure 93. The structure of data structure 33 in node 30 is the same as the structure of data structure 93, although the content of data structure 33 may be different from the content of data structure 93. The structure of data structure 73 in node 70 is the same as the structure of data structure 93, although the content of data structure 73 may be different from the content of data structure 93. The structure of data structure 53 in node 50 is the same as the structure of data structure 33, although the content of data structure 53 may be different from the content of data structure 93. The structure of data structure 113 in node 110 is the same as the structure of data structure 93, although the content of data structure 113 may be different from the content of data structure 93.

In other words, list processor 34 starts by picking one or mode nodes from its closest non-empty one of lists 32. Processor 34 then sends a UDP message, requesting a lookup, to node(s) it has chosen. Processor 34 then reperforms the processing above, by sending lookup messages to nodes it has learned about from previous lookup messages.

List processor 34 may be implemented with any of a variety of protocols. For example list processor 34 may be realized with the Kademelia protocol and lists 32 may correspond to the k buckets of that protocol (See "Kademlia: A peer-to-peer information system based on the XOR metric", P. Maymounkov et D. Mazieres, 1st International Workshop on Peer-to-peer Systems, MIT 2002, the contents of which is herein incorporated by reference.)

Each of list processors 14, 54, 74, 94, and 114 has the same structure as that of list processor 34.

List 36, thus generated in node 30, is the data received in UDP message 220 from node 90.

Thus, peer node 30 acts to receive a type of signal, the signal identifying a file, the file having a plurality of portions. Node 30 and node 70 act together to use the signal to select node 90. This selection process includes performing an XOR of ID 27 with node ID 31. Subsequently, node 30 receives IP address 19 and IP address 59 from node 90. These IP addresses may correspond to a swarm in the Bittorrent protocol, for example.

File transfer processor 38 includes instructions executed by CPU 35. File transfer processor 38 takes a list of IP addresses, such as list 36, and establishes TCP (Transport Control Protocol) connections to the nodes on the input list. Thus, having read the IP address 59 and port number for node 50, from list 36, node 30 initiates a TCP connection 3050 with node 50. Having read the IP address 19 and port number for node 10, from list 36, node 30 initiates a TCP connection 3010 with node 10.

In this example node 50 had previously established the TCP connection 5010 with node 10.

File transfer processor 38 then requests pieces of file set 17 from the nodes on the list, such as nodes 10 and 50. As node 30 thus acquires pieces of file set 17, node 30 makes those pieces available to other nodes in system 1.

Node 30 sends a UDP message to node 90, the message containing a request to store IP address 39 in association with ID 27, as the key, in data structure 93. Also stored in this association is a port number for communication with node 30.

Each of file transfer processors 18, 58, 78, 98, and 118 has the same structure as that of file transfer processor 38.

These peer TCP connections are symmetrical; data from file set 17 can flow in either direction. The messages sent on the TCP connections refer to pieces of file set 17 by index as described in a metainfo file. Downloaders generally download pieces in random order. Thus, node 30 is less likely to have a strict subset or superset of the pieces currently acquired by node 50.

Figure 5:
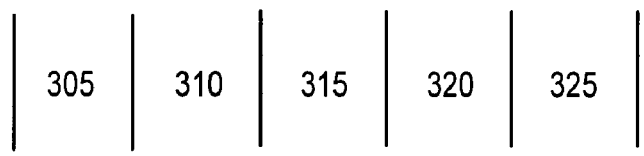
FIG. 5 shows data stored in a node in the system.

FIG. 5 shows file set 17. In general, file set 17 has multiple segments, even when file set 17 contains only a single file. File set 17 includes segments 305, 310, 315, 320, and 325.

Figure 6:
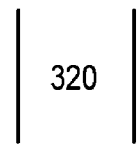
FIG. 6 shows data stored in another node in the system.

FIG. 6 shows data already stored in memory in node 50, at the time node 30 creates TCP connection 3050 to node 50. As shown in FIG. 6, node 50 stores segment 320 of file set 17, and not segments 305, 310, 315, and 325. Node 50 received segment 320 from node 10 via TCP connection 5010.

Figure 7:
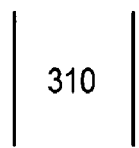
FIG. 7 shows data stored in yet another node in the system.
Figure 8:
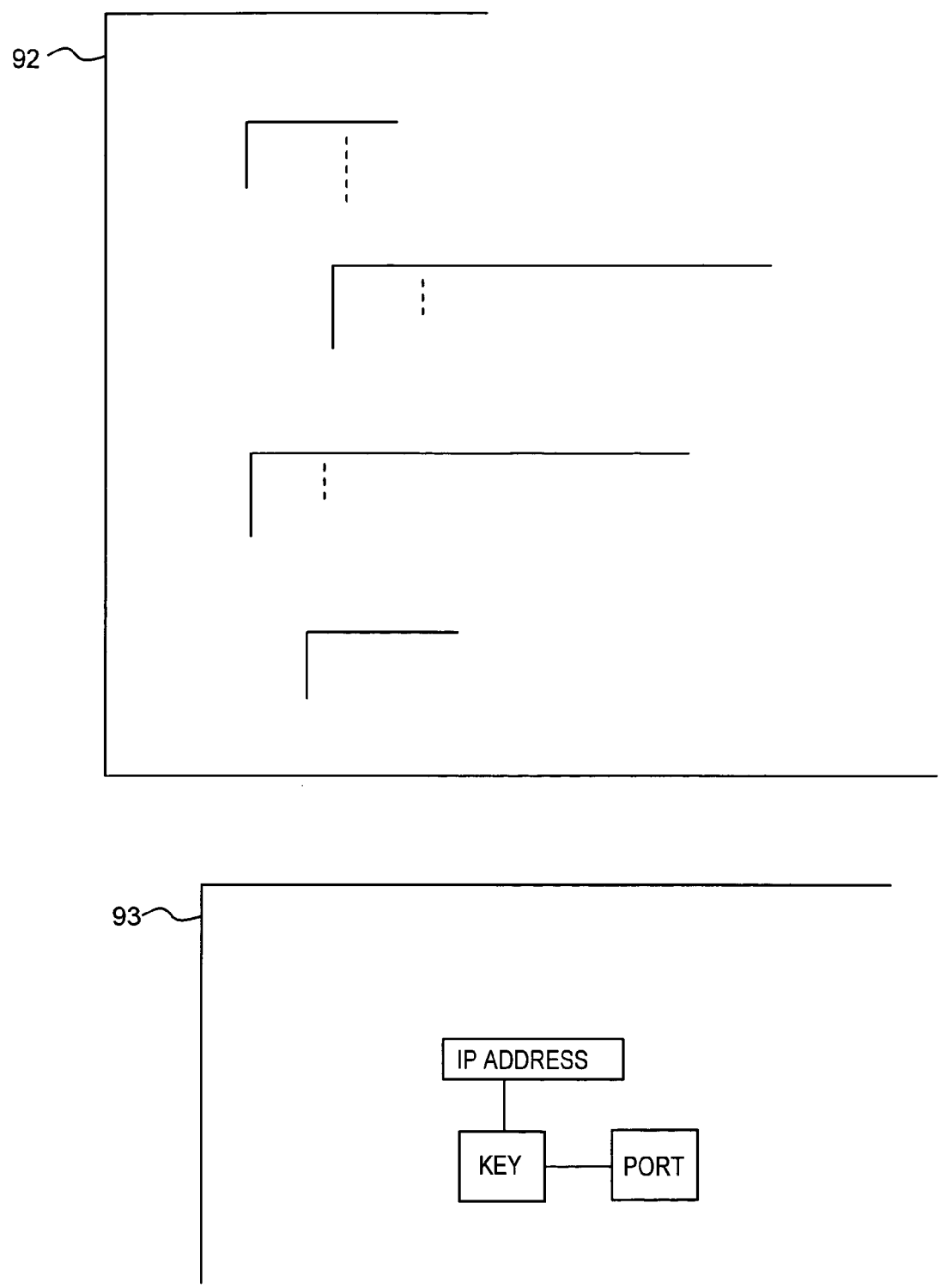
FIG. 8 is a diagram emphasizing another part of the exemplary system.

FIG. 7 depicts a time after the time depicted in FIG. 6. FIG. 7 shows data stored in memory in node 30 after node 30 creates TCP connection 3010 to node 10. As shown in FIG. 7, node 30 stores segment 310 of file set 17, and not segments 305, 315, 320 and 325. Node 30 received segment 310 from node 10 via TCP connection 3010.

Node 30 next sends segment 310 to node 50 via TCP connection 3050. Node 30 receives segment 320 from node 50 via TCP connection 3050.

Thus, list processors 14, 34, 54, 74, 94, and 114 act together to implement a type of overlay or virtual network on top of the global Internet, which can also be conceptualized as a distributed hash table for tracking which nodes (peers) are prepared to send or receive certain data. Peers publish their address to the distributed database for each file set they want to track in a decentralized manner.

More Detailed Description

An identifier for a file set can be produced any number of ways. For example, the file set may be partitioned as fixed-length slices. Each slice can be hashed to produce a 20-byte signature. The file set ID may then be a hash of the series of signatures, as described in the Bittorrent Protocol Specification v1.0 (wiki.theory.org/BitTorrentSpecification), the contents of which is herein incorporated by reference.

To initiate the process, node 10 generated ID 27 for file set 17, and stored its own IP address 19 in the node(s) having a node ID closest to ID 27.

For load balancing, there is a diversification option. An overloaded peer can respond back stating that you should do a diversified search for this key. Diversification is for handling overloaded nodes by way of number of requests and too many values on a key. The second case would happen in the case of a very large swarm. You would have a problem in terms of requests and the size of the list (and transferring that list to everyone who asks).

In other words, the peer(s) that store the list of peers that access a particular file set are found by comparing their node IDs to an ID for the file set. This may end up stored at least 20 nodes (as per its Kademlia algorithm). There are various ways of handling a surcharge on the hash table process. For example, if one of the 20 nodes is overloaded, that node may instruct requesters to actually store the information at SHA1 (file set ID). SHA1 is a one-way hash algorithm used to create digital signatures. This diversification optimization may be found in the Bittorrent client Azureus, Release 2.3.0.6 (azureus.sourceforge.net), the contents of which is herein incorporated by reference.

Throughout this Patent Application, certain processing may be depicted in serial, parallel, or other fashion, for ease of description. Actual hardware and software realizations, however, may be varied depending on desired optimizations apparent to one of ordinary skill in the art.

Benefits, other advantages, and solutions to problems have been described above with regard to specific examples. The benefits, advantages, solutions to problems, and any element (s) that may cause any benefit, advantage, or solution to occur or become more pronounced are not critical, required, or essential feature or element of any of the claims.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims. In general, the words "first," "second," etc., employed in the claims do not necessarily denote an order.

What is claimed is:

1. A method of distributing data within an internet having a plurality of nodes, the method comprising:
receiving, in a first node in the plurality of nodes, a first identifier, the first identifier corresponding to a file, the file having a plurality of portions;
subsequently, using the first identifier to select a second node in the plurality of nodes, by performing an operation with the first identifier and an ID for a node in the internet;
receiving, in the first node, an address set from the second node, the address set including a plurality of addresses;
in the first node, using a first address from the address set to send a message to a third node in the plurality of nodes;
subsequently, in the first node, receiving a first portion of the file from the third node;

in the first node, using a second address from the address set, to send the first portion of the file to a fourth node in the plurality of nodes; and in the first node, receiving a second portion of the file from the fourth node.

2. The method of claim 1 wherein the first node receives an address of the second node as a result of a logical operation between the first identifier and an identifier for another node in the plurality of nodes.

3. The method of claim 1 wherein using the first address includes making a TCP connection.

4. The method of claim 1 wherein the operation includes performing a bitwise XOR between the first identifier and an identifier for the first node.

5. A system of distributing data within an internet having a plurality of nodes, the system comprising:

circuitry that receives, in a first node in the plurality of nodes, a first identifier, the first identifier corresponding to a file, the file having a plurality of portions;

circuitry that subsequently uses the first identifier to select a second node in the plurality of nodes, by generating a first result by performing an operation with the first identifier and a second identifier, the second identifier corresponding to a node, generating a second result by performing the operation with the first identifier and a third identifier, the third identifier corresponding to another node, and selecting the second node by comparing the first and second results;

circuitry, in the first node, that receives a set of IP addresses from the second node, the set of IP addresses including a first IP address and a second IP address;

circuitry, in the first node, that uses the first IP address to send a message to a third node in the plurality of nodes;

circuitry, in the first node, that subsequently receives a first portion of the file from the third node;

circuitry, in the first node, that uses the second IP address to send the first portion of the file to a fourth node in the plurality of nodes; and circuitry, in the first node, that uses the second IP address to receive a second portion of the file from the fourth node.

6. The system of claim 5 wherein the circuitry that uses the first IP address includes means for making a TCP connection.

7. The method of claim 5 wherein using the second IP address to send includes making a TCP connection.

8. The method of claim 7 wherein using the second IP address to receive includes using the TCP connection.

9. The system of claim 5 wherein the operation includes performing a bitwise XOR.

10. A method of distributing data within an internet having a plurality of nodes, the method comprising:

receiving, in a first node in the plurality of nodes, a first identifier, the first identifier corresponding to a data structure, the data structure having a plurality of portions;

subsequently, using the first identifier to select a second node in the plurality of nodes, by generating a first result by performing an operation with the first identifier and a second identifier, the second identifier corresponding to a node, generating a second result by performing an operation with the first identifier and a third identifier, the third identifier corresponding to another node, and selecting the second node by comparing the first and second results;

receiving, in the first node, a set of IP addresses from the second node, the set of IP addresses including a first IP address and a second IP address;

in the first node, using the first IP address to send a message to a third node in the plurality of nodes;

subsequently, in the first node, receiving a first portion of the data structure from the third node;

in the first node, using the second IP address to send the first portion of the data structure to a fourth node in the plurality of nodes; and in the first node, using the second IP address to receive a second portion of the data structure from the fourth node.

11. The method of claim 10 wherein using the first IP address includes making a TCP connection.

12. The method of claim 10 wherein the operation includes performing a bitwise XOR.

13. The method of claim 10 wherein using the second IP address to send includes making a TCP connection.

14. The method of claim 13 wherein using the second IP address to receive includes using the TCP connection.

15. A method of distributing data within an internet having a plurality of nodes, the method comprising:

receiving, in a first node in the plurality of nodes, a first signal, the first signal corresponding to a file, the file having a plurality of portions;

subsequently, using the first signal to select a second node in the plurality of nodes, by generating a first result by performing an operation with the first signal and a second signal, the second signal corresponding to a node, generating a second result by performing an operation with the first signal and a third signal, the third signal corresponding to another node, and selecting the second node by comparing the first and second results;

receiving, in the first node, a set of IP addresses from the second node, the set of IP addresses including a first IP address and a second IP address;

in the first node, using the first IP address to send a message to the third node;

subsequently, in the first node, receiving a first portion of the file from the third node;

in the first node, using the second IP address to send the first portion of the file to a fourth node in the plurality of nodes; and in the first node, using the second IP address to receive a second portion of the file from the fourth node.

16. The method of claim 15 wherein using the first IP address includes making a TCP connection.

17. The method of claim 15 wherein the operation includes performing a bitwise XOR.

18. The method of claim 15 wherein using the second IP address to send includes making a TCP connection.

19. The method of claim 18 wherein using the second IP address to receive includes using the TCP connection.

20. The method of claim 1 further including sending a message from the first node to the second node, the message containing a request to store an address corresponding to the first node, in association with the first identifier.

21. The method of claim 1 further including sending a message from the first node to the second node, the message containing a request to store an address and port number corresponding to the first node, in association with the first identifier.

* * * * *